(12) United States Patent
Jain et al.

(10) Patent No.: US 11,860,867 B2
(45) Date of Patent: Jan. 2, 2024

(54) OPTIMIZING SCANS USING QUERY PLANNING ON BATCH DATA

(71) Applicant: Walmart Apollo, LLC, Bentonville, AR (US)

(72) Inventors: Mridul Jain, Cupertino, CA (US);
Saigopal Thota, Fremont, CA (US);
Rewati Mahendra Ovalekar, Fremont, CA (US); Sébastien Jean-Maurice Olivier Péhu, San Rafael, CA (US);
Saumya Agarwal, Milpitas, CA (US);
Sai Kiran Reddy Malikireddy, Fremont, CA (US); Gajendra Alias Nishad Kamat, Los Altos, CA (US);
Mitesh Sinha, Fremont, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/412,106

(22) Filed: Aug. 25, 2021

(65) Prior Publication Data

US 2023/0068831 A1 Mar. 2, 2023

(51) Int. Cl.
*G06F 15/16* (2006.01)
*G06F 16/2453* (2019.01)
*G06F 16/21* (2019.01)

(52) U.S. Cl.
CPC ...... *G06F 16/24532* (2019.01); *G06F 16/211* (2019.01)

(58) Field of Classification Search
None
See application file for complete search history.

(56) References Cited

U.S. PATENT DOCUMENTS

| | | | |
|---|---|---|---|
| 10,423,493 B1* | 9/2019 | Vig | G06F 11/3055 |
| 10,659,225 B2 | 5/2020 | Surla et al. | |
| 2015/0142751 A1* | 5/2015 | Bruce | G06F 16/2471 |
| | | | 707/662 |
| 2017/0039232 A1* | 2/2017 | Jayanth | G06F 16/24568 |
| 2017/0046412 A1* | 2/2017 | Levy | G06F 16/258 |
| 2018/0025025 A1 | 1/2018 | Davis et al. | |
| 2018/0046455 A1* | 2/2018 | Walsh | G06F 16/22 |
| 2018/0181451 A1* | 6/2018 | Saxena | G06F 9/545 |
| 2018/0260458 A1* | 9/2018 | Huang | G06F 16/24554 |
| 2020/0004749 A1 | 1/2020 | Slezak et al. | |
| 2020/0218717 A1* | 7/2020 | Sharma | G06F 16/2425 |
| 2021/0248129 A1* | 8/2021 | Paulsen | G06F 16/2379 |

\* cited by examiner

*Primary Examiner* — Alex Gofman
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform: bundling multiple registered queries of a dataset using a scheduling technique, wherein the dataset is homogenous in schema; running a single table scan of the dataset to process the multiple registered queries of the dataset in parallel; and generating a respective output responsive to each of the multiple registered queries. Other embodiments are disclosed.

20 Claims, 6 Drawing Sheets

420

| 510 – Determining access patterns of data clients |

| 520 – Generating, based on the access patterns, a first layer of the dataset layers |

| 530 – Generating, based on the access patterns, a second layer of the dataset layers |

| 540 – Periodically updating the second layer |

| 550 – Generating, based on the access patterns, a third layer of the dataset layers |

FIG. 5

OPTIMIZING SCANS USING QUERY PLANNING ON BATCH DATA

TECHNICAL FIELD

This disclosure relates generally relates to optimizing scans using query planning on batch data.

BACKGROUND

Some datasets are very large, such as exceeding a billion rows of data. Additionally, some dataset have fragmented data. Running multiple queries that involve full table scans of such datasets can be time-consuming and use extensive computing resources.

BRIEF DESCRIPTION OF THE DRAWINGS

To facilitate further description of the embodiments, the following drawings are provided in which:

FIG. 5 illustrates a flow chart of a block of FIG. 4 of translating the event records into a NoSQL schema, according to an embodiment of FIG. 4.

Figure 1:
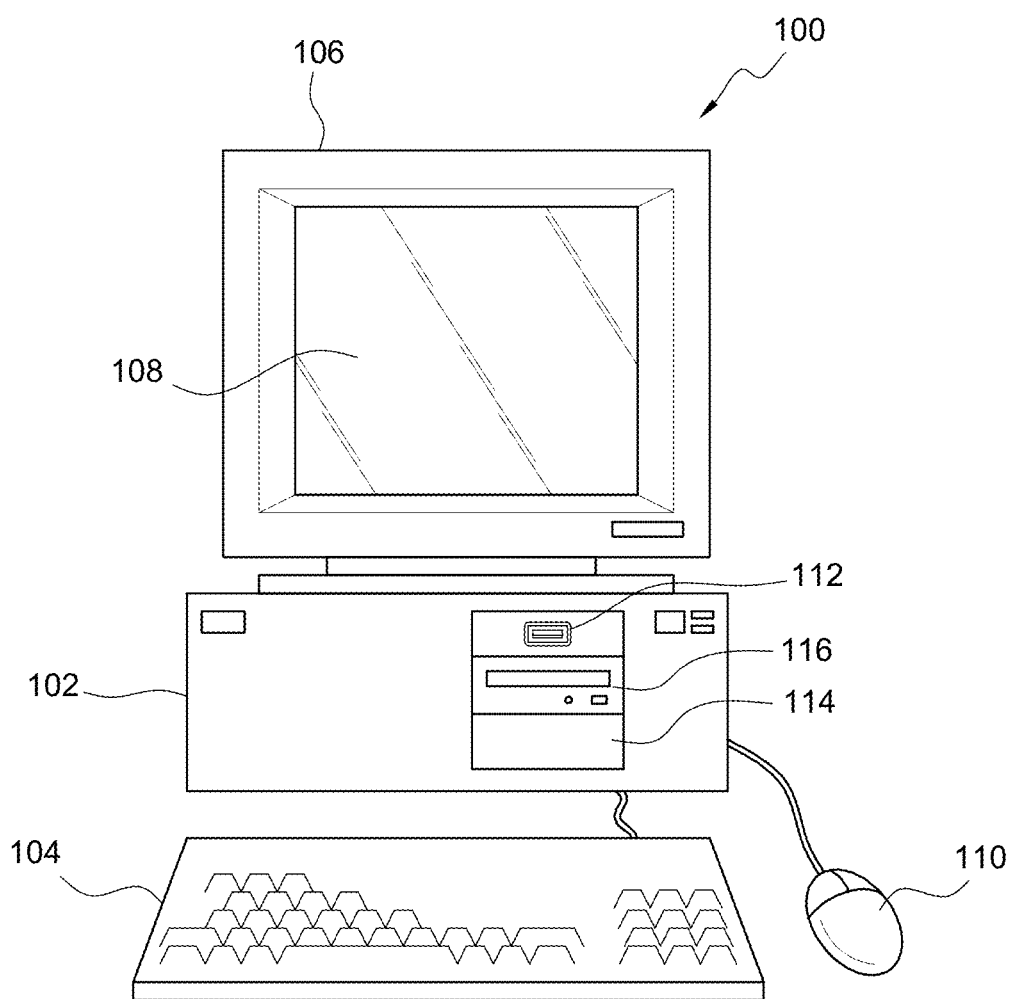
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 minute, 5 minutes, 10 minutes, or another suitable time delay period.

DESCRIPTION OF EXAMPLES OF EMBODIMENTS

Figure 2:
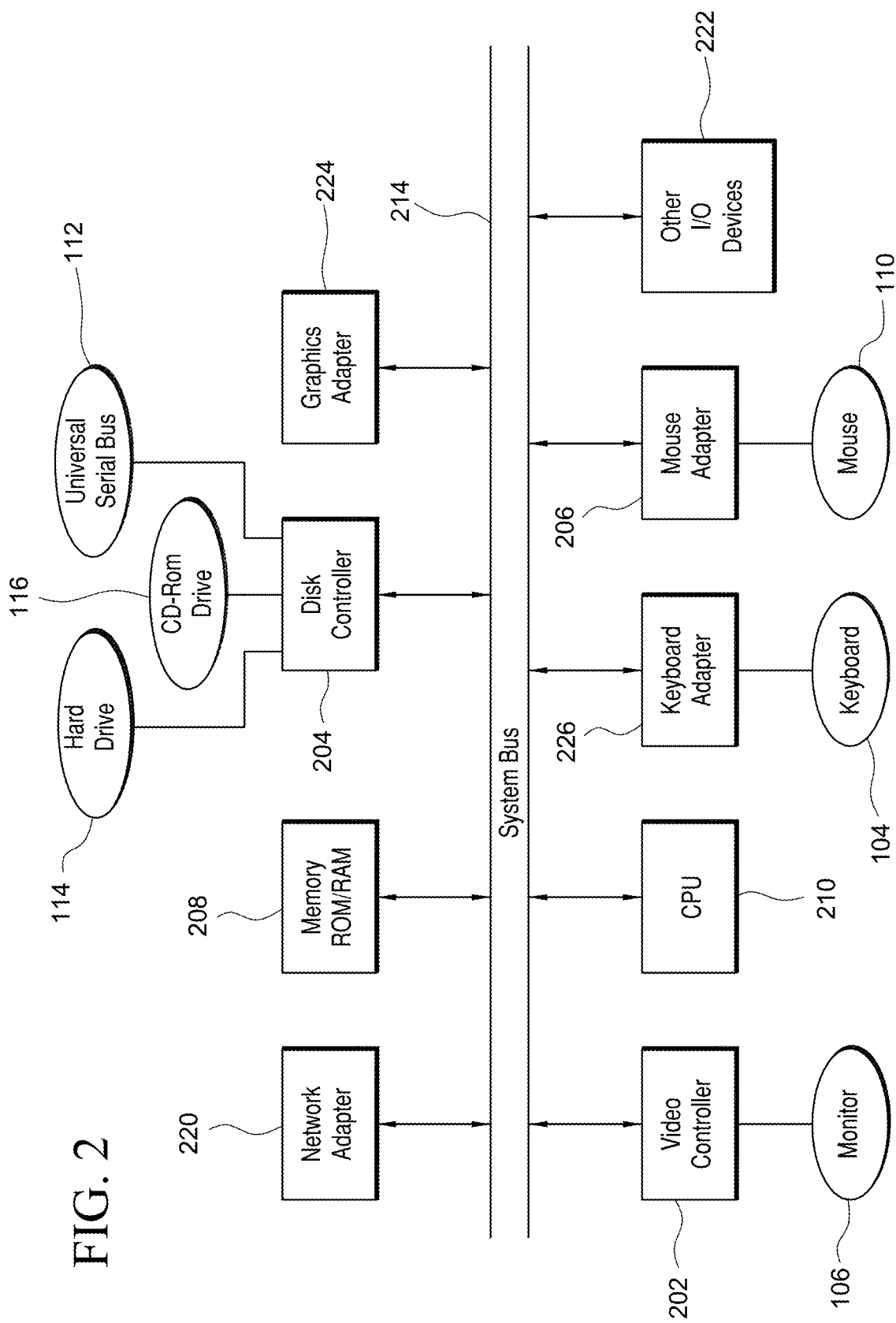
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
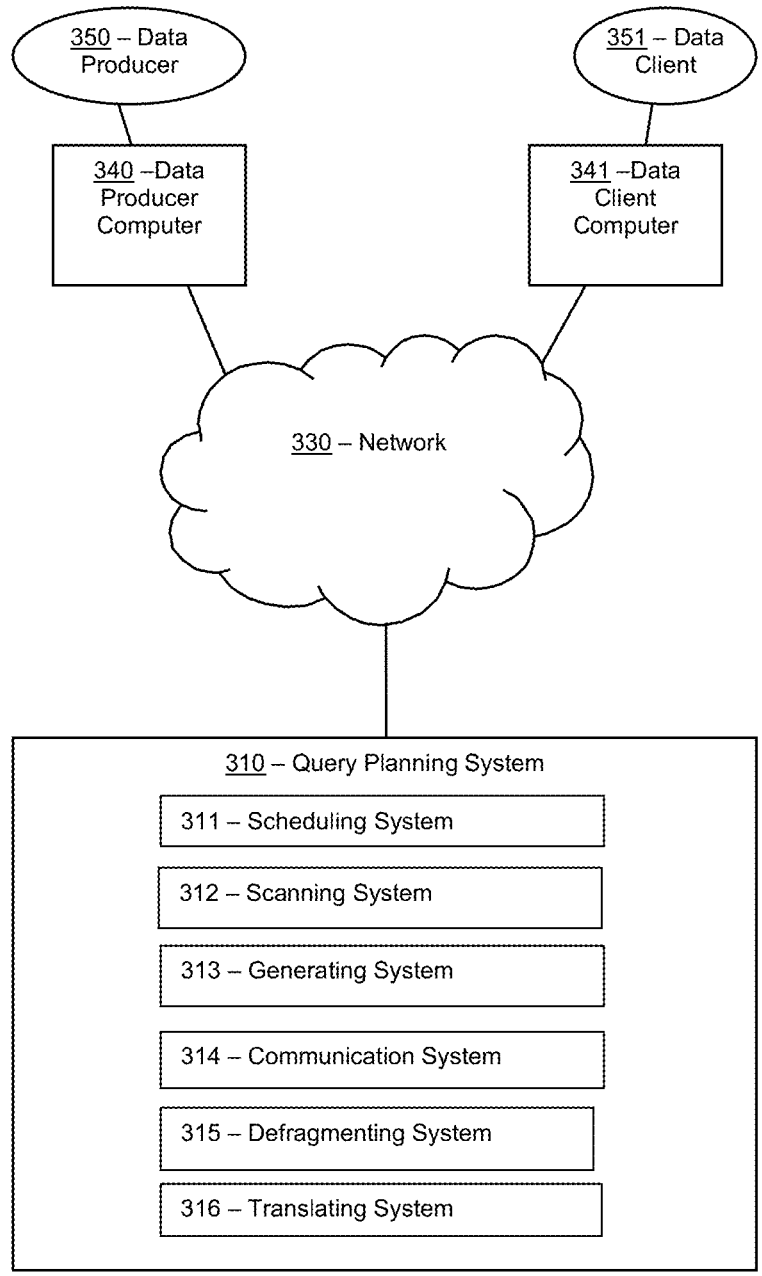
FIG. 3 illustrates a block diagram of a system that can be employed for an optimizing scans using query planning on batch data, according to an embodiment.

Turning ahead in the drawings, FIG. 3 illustrates a block diagram of a system 300 that can be employed for optimizing scans using query planning on batch data, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a query planning system 310, and in some embodiments, can include data producer computers (e.g., 340) operated by data producers (e.g., 350), data client computers (e.g., 341) operated by data clients (e.g., 351), and/or a network 330. Query planning system 310, data producer computer 340, and/or data client computer 341 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, query planning system 310, data producer computer 340, and/or data client computer 341. Additional details regarding query planning system 310, data producer computer 340, and/or data client computer 341 are described herein.

In a number of embodiments, each of query planning system 310, data producer computer 340, and/or data client computer 341 can be a special-purpose computer programmed specifically to perform specific functions not associated with a general-purpose computer, as described in greater detail below.

In some embodiments, query panning system 310 can be in data communication through network 330 with data producer computer 340 and/or data client computer 341. Network 330 can be a public network (e.g., the Internet), a private network, or a hybrid network. In some embodiments, the operator and/or administrator of system 300 can manage system 300, the processor(s) of system 300, and/or the memory storage unit(s) of system 300 using the input device(s) and/or display device(s) of system 300.

In several embodiments, query planning system 310 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to query planning system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of query planning system 310. In a similar manner, the processors and/or the non-transitory computer-readable media can be local and/or remote to each other.

Meanwhile, in many embodiments, query planning system 310 also can be configured to communicate with and/or include one or more databases. The one or more databases can include a query planning database, a data producer database or data client database, for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between query planning system 310, network 330, data producer computer 340, data client computer 341, and/or the one or more databases can be implemented using any suitable manner of wired and/or wireless communication. Accordingly, query planning system 310 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, query planning system 310 can include a scheduling system 311, a scanning system 312, a generating system 313, a communication system 314, a defragmenting system 315, and/or a translating system 316. In many embodiments, the systems of query planning system 310 can be modules of computing instructions (e.g., software modules) stored at non-transitory computer readable media that operate on one or more processors. In other embodiments, the systems of query planning system 310 can be implemented in hardware. Query planning system 310 can be a computer system, such as computer system 100 (FIG. 1), as described above, and can be a single computer, a single server, or a cluster or collection of computers or servers, or a cloud of computers or servers. In another embodiment, a single computer system can host query planning system 310. Additional details regarding query planning system 310 and the components thereof are described herein.

Figure 4:
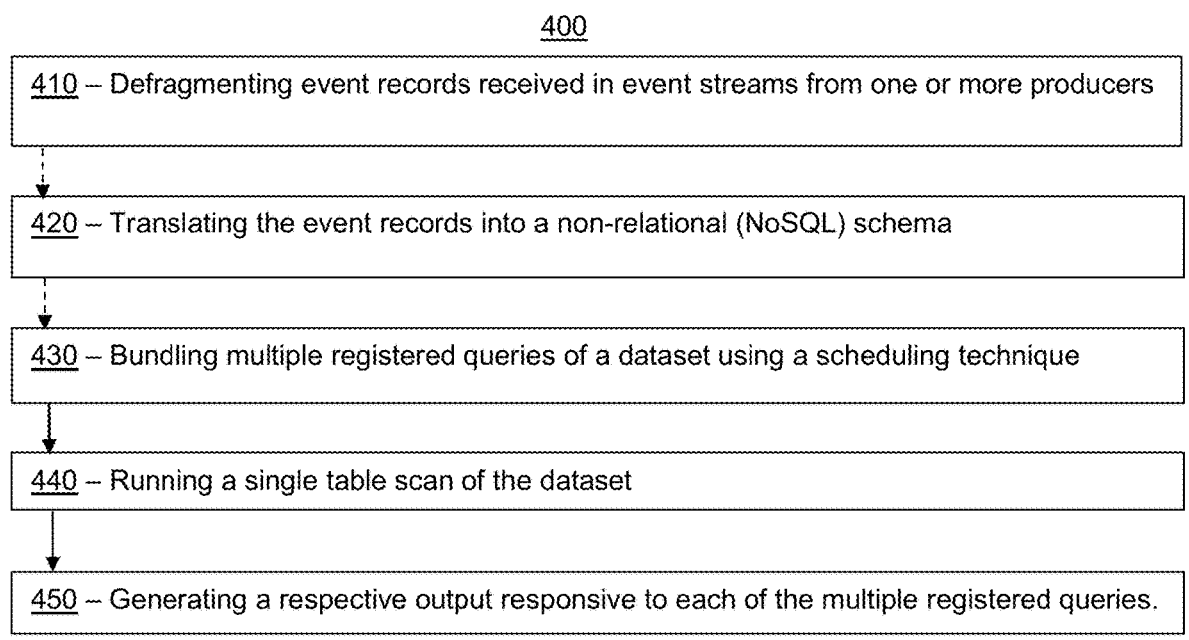
FIG. 4 illustrates a flow chart for a method of optimizing scans using query planning on batch data, according to another embodiment.

Turning ahead in the drawings, FIG. 4 illustrates a flow chart for a method 400 of optimizing scans using query planning on batch data, according to another embodiment. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) and/or query planning system 310 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as query planning system 310. The processor(s) can be similar or identical to the processor(s) described above with respect to computer system 100 (FIG. 1).

Referring to FIG. 4, method 400 optionally can include a block 410 of defragmenting event records received in event streams from one or more producers by assigning user identifiers of users to the event records in a user domain object model. The term "producers" can be used interchangeably with the term "data producers," which can be similar or identical to data producer 350. In several embodiments, each producer of the one or more producers can have independent objectives and/or goals that are separate from another producer. In various embodiments, one or more of the objectives and/or goals of each producer of the one or more producers can overlap with the objectives and/or goals of other producers, even when the producers are interacting with the same user or users. In many embodiments, each producer of the one or more producers can operate without the benefit of a full or collective view of each user profile and/or a history of interactions with each user. For example, producer A can send an email campaign to one or more users for a certain product on day one, while producer B sends a coupon for a certain product on day two to the same user. In both events, producer A and producer B, acting without knowledge of the purpose and/or an action of each producer, receive different sets of data from the same user that can result in fragmented views of the same user. In some embodiments, data producers can be viewed as different modules that can produce data from various interactions with users. In many embodiments, user interactions can be captured by the producers then shared via a downstream pipeline or repository of data.

In several embodiments, block 410 of defragmenting data from event records can include using a type of data defragmentation process (e.g., module) that can receive data from multiple different sources and with different identifiers (e.g., an email, a cookie, a device). In some embodiments, a defragmenting process can determine whether each source and/or identifier is mapped (e.g., identified) to a user. In various embodiments, after identifying the same user is mapped to the different sources from different producers, assigning (e.g., attaching) an identifier (e.g., a common identifier) to the same user for each of the events to the same user associated with each of the producers.

In a number of embodiments, block 410 can include generating a defragmented single view of each user as a semantic representation for managing large volumes of data. In some examples, the dataset can exceed 10 billion data points. In several embodiments, a defragmented single view of each user of multiple users can include a coherent way to represent a user (e.g., a customer) comprehensively (e.g., entirety) by incorporating or mapping events, such as a user identifier, a user profile, an attribute, an inferred attribute, an interaction, a touchpoint, an attribution signal and/or another suitable interaction. In various embodiments, the defragmented single view additionally can provide a definitive set of privacy safe, flexible logical rules used to map current and new customer attributes in a scalable fashion. For example, an internal and/or external user can feed data and/or responses to a producer, a provider, a modeler, an architect, and/or another suitable data producer, which can represent some aspect of a user and/or a representation of the user.

Conventionally, data producers historically relied on relational databases via entity relational modeling by first transforming data representations to a set of real-time application programming interfaces (APIs) which enabled a real-time serving. The entity relational modeling would produce a batch table or a Hadoop Distributed File System table for the serving. Such a conventional process is time-consuming and uses extensive computing resources during implementation.

In some embodiments, using non-relational (NoSQL) databases for large data domains can be advantageous as a technical improvement over the conventional technology and/or systems for managing large unrelated documents and/or data records.

In various embodiments, block 410 can include combining the event records into a single state of a customer domain object model (CDOM) for serving in batch data or real-time.

In some embodiments, block 410 also can include identifying which respective records of the event records can be associated with each respective user of the users using a set of rules for mapping scalable representations. In various embodiments, block 410 further can include assigning each respective user of the users a respective user identifier.

In several embodiments, block 410 additionally can include converting the scalable representations to automated artifacts for the producers to provide data into a central representation. In some embodiments, generating a defragmented single view of each user also can use a predefined set of rules to convert the representation of the user to automated artifacts (e.g., software) of different types. For example, an automated artifact can include an instrumentation stub for producers to provide data into a central representation without first coordinating with peer producers.

In several embodiments, method 400 also optionally can include a block 420 of translating the event records into a non-relational (NoSQL) schema. In many embodiments, the NoSQL schema can include dataset layers. In some embodiments, block 420 can be implemented as shown in FIG. 5 and described below.

In various embodiments, tracking query performances via NoSQL and/or denormalized state implementation can include using translation rules. In some embodiments, the translation rules can be applied to data, including, for example, large amounts of data of users on a large scale accumulated over a number of years. In many embodiments, the translation rules can include distilling the rules of translating from a user domain object model representation to a NoSQL schema-based state. Such translation rules can provide advantages over the conventional system, such as increased cost efficiency and securing privacy of the data.

In a number of embodiments, generating a user domain object model can be implemented in 3 stages, such as an L1 state, an L2 state, and an L3 state, as discussed further below.

In various embodiments, the L1 state can represent a physical implementation of the CDOM. In some embodiments, the L1 state can represent a snapshot of the relevant data at a point in time of a user. In some embodiments, relevant data can include such data points as a user attribute, a user profile, a historical interaction, and/or other suitable information about a user.

In several embodiments, the L2 state can include generating intermediate aggregations and/or transformations, which can be servable to cover a wide variety of use cases and/or access patterns of data clients and/or client teams. In some embodiments, the intermediate aggregations and/or transformations produced for L2 can be produced via one or more translations from the L1 state to the L2 state. In various embodiments, the intermediate aggregations and/or transformations can include deploying cost efficient algorithms where the cost efficient algorithms can be used on large data. For example, a cost efficient algorithm can include a sliding windows algorithm used for large data instead of smaller states in regular cases.

In various embodiments, the L3 state can include enabling data clients (e.g., client teams, tenants) to define their own materialized view rules for the L3 state, which can include data from the L1 state or L2 state. For example, the L3 state can represent a "Bring your own model" concept for batching big data systems. In some embodiments, using the L3 state can help data clients host a particular L3 state that is part of a central system. In many embodiments, one or more advantages of hosting a particular L3 state for data clients can include a saving state, a decrease in computing costs, and/or avoiding duplicate and/or redundant processing among data clients. In many embodiments, using the L3 state also can be advantageous by enabling privacy compliance by avoiding sensitive user tokens, allowing attributes to permeate into data client spaces, and/or another suitable advantage.

In some embodiments, method 400 further can include a block 430 of bundling multiple registered queries of a dataset using a scheduling technique. In many embodiment, the dataset can be homogenous in schema.

In various embodiments, block 430 of bundling multiple registered queries of a dataset using a scheduling technique can include optimizing read query access, via an application of one or more algorithms, by recasting the problem as a scheduling problem. Conventionally, access and/or read query access via a clever state implementation can include studying data access patterns. In some embodiments, optimizing read query access can include determining (i) types of queries (e.g., registered queries) being fired and (ii) a proportion of queries relative to an amount of data to be accessed and/or scanned. In various embodiments, block 430 can provide a technological improvement over conventional query planning by determining whether or not to combine queries with requests for similar attributes and/or another suitable request metric.

In some embodiments, block 430 can include first registering queries then parsing each registered query to extract attributes from each request creating a homogenous dataset of the registered queries. For example, a registered query 1 can request all user records and/or user identifiers associated with a particular age group, a registered query 2 can request all users associated with specific demographics, and a registered query 3 can request all users associated with (i) a specific preference, and (ii) from a particular geographical location, as well as a variety of other types of conditional filters.

In various embodiments, block 430 can include extracting enough relevant attributes from each registered query responsive to each registered query and input the relevant attributes into a homogenous schema.

In various embodiments, method 400 additionally can include a block 440 of running a single table scan of the dataset to process the multiple registered queries of the dataset in parallel. In several embodiments, block 440 can include extracting attributes from the respective row of the dataset responsive to the multiple registered queries.

In several embodiments, an advantage of block 440 can include running infrequent single full table scans versus running multiple full tables scans per each query. In some embodiments, a precondition to implementing block 440 can be that the data (e.g., each record) is homogenous in schema and an assumption that every query generally is run using a full table scan as part of a domain.

In many embodiments, additional advantages of block 440 can include (i) decreasing the use of computer resources by running fewer scans and (ii) increasing the speed of running full table scans by running the full table scans in parallel. In various embodiments, block 440 can provide an improvement over the conventional method of running each of the queries separately, which can be time-consuming and inefficient due to redundant scans for similar attributes of each request. In many embodiments, block 440 can include events based on a few hundred queries to build different user segments and running a full table scan on each of the queries that can include accessing billions of rows of user records.

In a number of embodiments, method 400 also can include a block 450 of generating a respective output responsive to each of the multiple registered queries.

Turning ahead in the drawings, FIG. 5 illustrates a flow chart of block 420 of translating the event records into a NoSQL schema. Block 420 is merely exemplary and is not limited to the embodiments presented herein. Block 420 can be employed in many different embodiments and/or examples not specifically depicted or described herein. In some embodiments, the procedures, the processes, and/or the activities of block 420 can be performed in the order presented. In other embodiments, the procedures, the processes, and/or the activities of block 420 can be combined or skipped.

Figure 6:
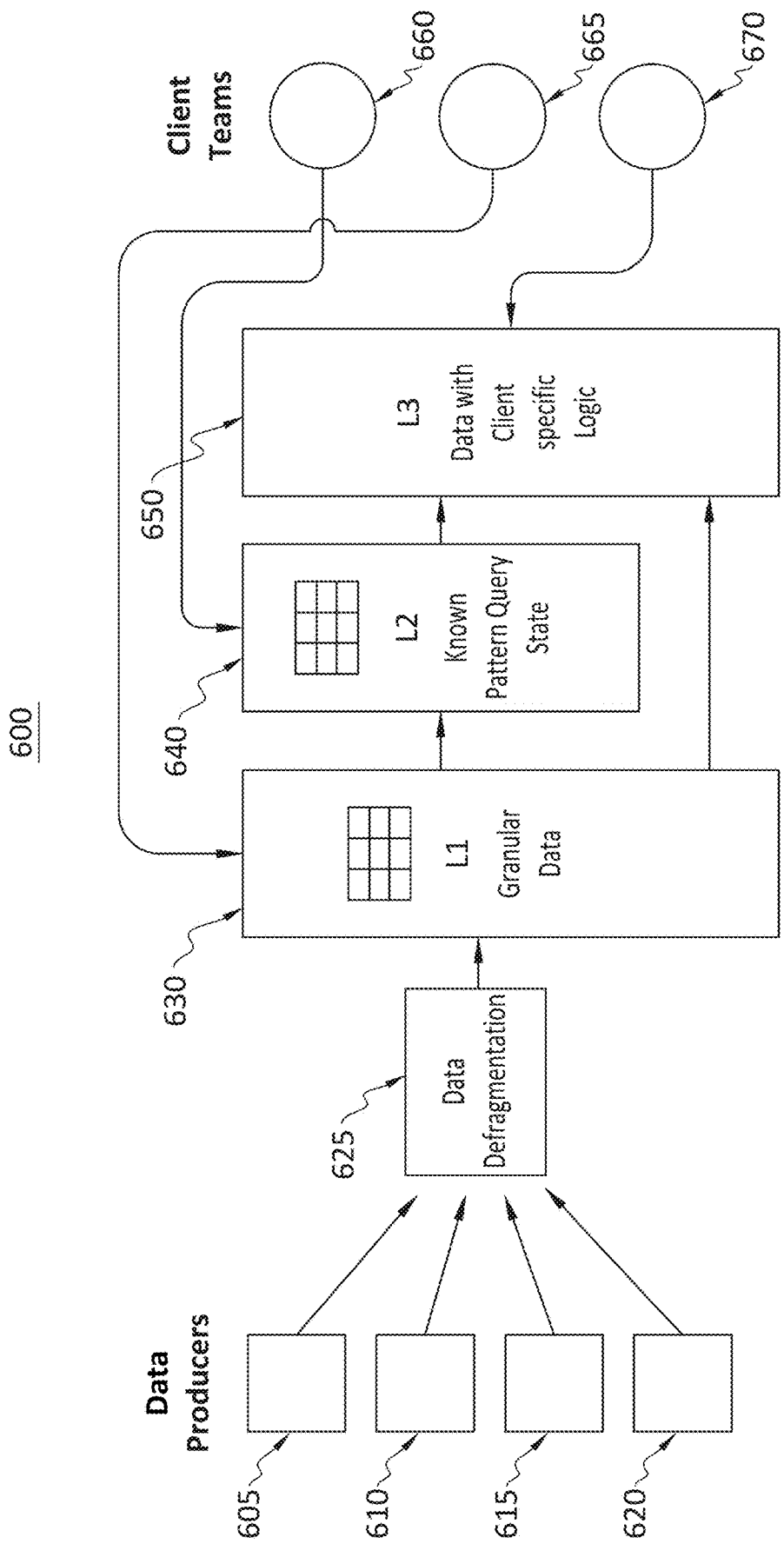
FIG. 6 illustrates a flow chart for a method of running a single table scan of a dataset homogenous in schema, according to an embodiment.

Referring to FIG. 5, block 420 also can include a block 510 of determining access patterns of data clients. In some embodiments, the dataset layers can be based on the access patterns of the data clients. Block 510 can be similar or identical to the activities described below in connection with blocks 630-650 (FIG. 6).

In a number of embodiments, block 420 further can include a block 520 of generating, based on the access patterns, a first layer of the dataset layers including user profiles of the users and historical interactions of the users. The term first layer can be used interchangeably with an L1 layer and/or an L1 table layer. Block 520 can be similar or identical to the activities described below in connection with a block 630 (FIG. 6).

In some embodiments, the L1 table layer can include data presented in a granular format. In various embodiments, access patterns known from client teams and/or teams of data clients (e.g., 351 (FIG. 3)) can define each of the layers of the table schemas.

In several embodiments, block 420 additionally can include a block 530 of generating, based on the access patterns, a second layer of the dataset layers including intermediate states for a subset of queries of the access patterns that exceed a predetermined threshold. In some embodiments, the intermediate states can include one or more of aggregations or transformations responsive to the subset of the queries. The term second layer can be used interchangeably with an L2 layer and/or an L2 table layer. Block 530 can be similar or identical to the activities described below in connection with a block 640 (FIG. 6).

For example, the second L2 layer can be expressed in a table format where the table can include 100 bundled registered queries for each data client (e.g., data client 660, 665, or 670 (FIG. 6), described below), as follows:

TABLE 1

| | L2 layer | | |
| --- | --- | --- | --- |
| User Number | Dataset Number | Query Number | Data Client Number |
| User 1 | Dataset 1 | Query 1 | 660 |
| User 2 | Dataset 1 | Query 2 | 665 |
| User 3 | Dataset 1 | Query 3 | 670 |

In various embodiments, the L2 table layer can include a layer of tables with previously completed "commonly-asked-for" aggregations and/or transformations made available for access by data clients and/or client teams. In some embodiments, the L2 state also can be referred to as a "known-pattern-query state." In several embodiments, the L2 layer can include proactively updating additional patterns of data access by data clients and/or client teams in real time. In many embodiments, when one or more client teams repeatedly conduct aggregations and/or transformations or a specific kind of data access, such as, accessing the same query from the L1 tables, a new table can be created proactively in L2, where the newly created table in L2 can be saved to compute and/or can be pre-computed for access at a later date or time.

For example, client teams (e.g., data clients) can access the L1 table and the L2 table to run a number of registered queries for data responsive to the queries. In this example, client teams can directly access the L1 tables if they believe that a use case would benefit from granular data or if the L2 tables do not support the transformations and/or aggregations requested. In this example, a client team can directly access L1 tables then perform the transformations on their own. In another example, client teams can access and/or use the known-pattern-query state of L2 when a use case includes one of the known patterns in the known-pattern-query state, thus the client teams can run one or more queries using the L2 state to access already transformed and/or processed states. In another example, client teams that have specific transformations previously stored as data in the L3 tables, the client teams can access L3 directly.

In another example, client teams can submit queries to a query planning engine to optimize multiple queries. In this example, multiple client teams can run different queries on a particular L2 table also in parallel. In one such example, client teams submit their queries to the query planning engine with a selected dataset that can include a number of specific transformations, filters, and/or fields from the dataset with an expected run time and completion time. In another such example, a query planning engine can collect multiple such registered queries and/or requests from client teams, then schedule each job by bundling all data from registered queries associated with a specific dataset. In following this example, the execution of running the registered query can include reading each row from the dataset once, where all the registered queries are executed on the row of data in parallel, which can advantageously minimize data access times.

In various embodiments, block 420 also can include a block 540 of periodically updating the second layer as additional queries of the access patterns exceed the predetermined threshold.

In a number of embodiments, block 420 additionally can include a block 550 of generating, based on the access patterns, a third layer of the dataset layers including transformed data specific to one or more of the data clients. In several embodiments, the transformed data can include the event records from another one of the dataset layers. The term third layer can be used interchangeably with an L3 layer and/or an L3 table layer. Block 550 can be similar or identical to the activities described below in connection with a block 650 (FIG. 6).

In various embodiments, the L3 Table layer can be available for any client team and/or data clients to store transformed data specific to a client team and/or data client. In some embodiments, the L3 table can allow the client teams to avail all the advantages that come with being part of the data object model, such advantages can include privacy, access control, and/or another suitable advantage while simultaneously providing the freedom to the client teams to store data in whichever format selected.

Turning ahead in the drawings, FIG. 6 illustrates a flow chart for a method 600 of running a single table scan of a dataset homogenous in schema, according to an embodiment. Method 600 can illustrate defragmenting event records received from one or more producers, including translating the event records into a NoSQL schema. Method 600 also can illustrate bundling multiple registered queries of a dataset. Method 600 can be similar to method 400 (FIG. 4) and/or block 420 (FIG. 5), and various activities of method 600 can be similar or identical to various activities of method 400 (FIG. 4) and/or block 420 (FIG. 5). Method 600 can be employed in many different embodiments and/or examples not specifically depicted or described herein. In some embodiments, the procedures, the processes, and/or the activities of method 600 can be performed in the order presented or in parallel. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) and query planning system 310 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as query planning system 310. The processor(s) can be similar or identical to the processor(s) described above with respect to computer system 100 (FIG. 1).

In various embodiments, method 600 can include block 625 of defragmenting data, which can include defragmenting data received from multiple data producers, such as data producers 605, 610, 615, and/or 620. In a number of embodiments, after defragmenting the data, block 625 can include assigning identifiers to data mapped to a user or a group of users. Blocks 625 can be similar or identical to the activities described in connection with block 410 (FIG. 4).

In some embodiments, method 600 can proceed after block 625 to a block 630 of generating a first NoSQL table L1. In various embodiments, block 630 can include generating the L1 table of data defragmented from the data producers where the rows of each table can be associated with an identifier of a user. In some embodiments, generating the L1 table can include using table schema based on data client access patterns.

In various embodiments, method 600 can proceed after block 630 to a block 640 and/or a block 650. In some embodiments, block 630 can skip block 640 and go directly to block 650, as described further below. In some embodiments, method 600 can include block 640 of generating a second NoSQL table L2. In several embodiments, block 640 can include generating an L2 table of known pattern-query state data. In various embodiments, the L2 tables can include data aggregations, transformations, and/or joins. In many embodiments, joins can be pre-calculated based on known query-access patterns and/or known-pattern query states.

In several embodiments, method 600 can proceed after block 640 to a block 650 of generating a third NoSQP table L3. In various embodiments, block 650 can include generating an L3 table of data with client specific logic.

In various embodiments, one or more data clients can be grouped together, or represented, as client teams, such as client teams 660, 665, and/or 670. In several embodiments, the client teams can access one or more data layers (L1, L2, or L3 tables) by one or more data clients in parallel. For example, client team 660 can access the L1 table data while client team 665 accesses the L2 table data, and while client team 670 accesses the L3 table data, in parallel.

Returning back in the drawings, FIG. 3 illustrates a block diagram of query planning system 310. Query planning system 310 is merely exemplary and is not limited to the embodiments presented herein. Query planning system 310 can be employed in many different embodiments or examples not specifically depicted or described herein. In some embodiments, certain elements or systems of query planning system 310 can perform various procedures, processes, and/or acts. In other embodiments, the procedures, processes, and/or acts can be performed by other suitable elements or systems.

In a number of embodiments, a scheduling system 311 can at least partially perform block 430 (FIG. 4) of bundling multiple registered queries of a dataset using a scheduling technique.

In several embodiments, scanning system 312 can at least partially perform block 440 (FIG. 4) of running a single table scan of the dataset to process the multiple registered queries of the dataset in parallel.

In various embodiments, generating system 313 can at least partially perform block 450 (FIG. 4) of generating a respective output responsive to each of the multiple registered queries, block 630 (FIG. 6) of generating a first NoSQL table, block 640 (FIG. 6) of generating a second NoSQL table, and/or block 650 (FIG. 6) of generating a third NoSQP table.

In some embodiments, communication system 314 can at least partially perform block 450 (FIG. 4) of generating a respective output responsive to each of the multiple registered queries.

In a number of embodiments, defragmenting system 315 can at least partially perform block 410 (FIG. 4) of defragmenting event records received in event streams from one or more producers by assigning user identifiers of users to the event records in a customer domain object model, and/or block 625 (FIG. 6) of defragmenting data can include defragmenting data received from multiple data producers and/or multiple sources.

In several embodiments, translating system 316 can at least partially perform block 420 (FIG. 4) of translating the event records into a non-relational (NoSQL) schema, block 510 (FIG. 5) of determining access patterns of data clients, wherein the dataset layers are based on the access patterns of the data clients, block 520 (FIG. 5) of generating, based on the access patterns, a first layer of the dataset layers comprising user profiles of the users and historical interactions of the users, block 530 (FIG. 5) of generating, based on the access patterns, a second layer of the dataset layers comprising intermediate states for a subset of queries of the access patterns that exceed a predetermined threshold, block 540 (FIG. 5) of periodically updating the second layer as additional queries of the access patterns exceed the predetermined threshold, block 550 (FIG. 5) of generating, based on the access patterns, a third layer of the dataset layers comprising transformed data specific to one or more of the data clients, block 630 (FIG. 6) of generating a first NoSQL table, block 640 (FIG. 6) of generating a second NoSQL table, and/or block 650 (FIG. 6) of generating a third NoSQP table.

In many embodiments, the techniques described herein can provide several technological improvements. In some embodiments, the techniques described herein can provide for running a single table scan of a dataset to process multiple registered queries using a NoSQL schema for large data systems in parallel. In a number of embodiments, the techniques described herein can advantageously enable efficient utilization of a query planning system, such as 310, which can beneficially result in a reduction in processor use and memory cache.

In many embodiments, the techniques described herein can be used continuously at a scale that cannot be handled using manual techniques. For example, each full table scan can be run on a dataset that can exceed 10 billion rows of data.

In a number of embodiments, the techniques described herein can solve a technical problem that arises only within the realm of computer networks, as running a single table scan based on bundled registered queries in parallel does not exist outside the realm of computer networks. Moreover, the techniques described herein can solve a technical problem that cannot be solved outside the context of computer networks. Specifically, the techniques described herein cannot be used outside the context of computer network.

Various embodiments can include a system including one or more processors and one or more non-transitory computer-readable media storing computing instructions configured to run on the one or more processors and perform certain acts. The acts can include bundling multiple registered queries of a dataset using a scheduling technique. The dataset can be homogenous in schema. The acts also can include running a single table scan of the dataset to process the multiple registered queries of the dataset in parallel. The acts further can include generating a respective output responsive to each of the multiple registered queries.

A number of embodiments can include a method being implemented via execution of computing instructions configured to run at one or more processors and stored at one or more non-transitory computer-readable media. The method can include bundling multiple registered queries of a dataset using a scheduling technique. The dataset can be homogenous in schema. The method also can include running a single table scan of the dataset to process the multiple registered queries of the dataset in parallel. The method additionally can include generating a respective output responsive to each of the multiple registered queries, Although optimizing scans using query planning on batch data has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 3-6 may include different procedures, processes, and/or activities and be performed by many different modules, in many different orders, and/or one or more of the procedures, processes, or activities of FIGS. 3-6 may include one or more of the procedures, processes, or activities of another different one of FIGS. 3-6. As another example, the systems within query planning system 310, such as scheduling system 311, generating system 313, communication system 314, defragmenting system 315, and/or translating system 316. Additional details regarding query planning system 310, scheduling system 311, generating system 313, communication system 314, defragmenting system 315, and/or translating system 316 (see FIG. 3), can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory computer-readable media storing computing instructions configured to run on the one or more processors and perform:
    translating event records into a non-relational (NoSQL) schema, wherein translating the event records into the NoSQL schema comprises:
        determining access patterns of data clients, wherein dataset layers are based on the access patterns of the data clients;
        generating, based on the access patterns, a second layer of the dataset layers, wherein the second layer comprises intermediate states for a subset of queries of the access patterns that exceed a predetermined threshold, wherein the NoSQL schema comprises the dataset layers, wherein the dataset layers comprises a first layer and the second layer, and wherein the first layer comprises user profiles of users; and
        periodically updating the second layer in the NoSQL schema as additional queries of the access patterns exceed the predetermined threshold;
    defragmenting the event records by assigning user identifiers of the users to the event records received in the event streams from the one or more producers in a user domain object model;
    bundling multiple registered queries of a dataset using a scheduling technique, wherein the dataset is homogenous in schema;
    running a single table scan of the dataset to process the multiple registered queries of the dataset in parallel; and
    generating a respective output responsive to each of the multiple registered queries.

2. The system of claim 1, wherein running the single table scan further comprises, at each respective row of the dataset:
    extracting attributes from the respective row of the dataset responsive to the multiple registered queries.

3. The system of claim 1, wherein
    defragmenting the event records comprises:
        using a type of data defragmentation process configured to receive data from multiple sources with the user identifiers;

determining, using the data defragmentation process, whether each source of the multiple sources with the user identifiers is mapped to a same user; and after identifying the same user is mapped to more than one source of the multiple sources or more than one of the one or more producers, re-assigning a common identifier for the same user for each respective event record of respective event records mapped to the same user, wherein the event records comprise the respective event records.

4. The system of claim 3, wherein:

a customer domain object model combines the event records into a single state for serving in batch data or real-time.

5. The system of claim 1, wherein defragmenting the event records comprises:

identifying which respective records of the event records are associated with each respective user of the users using a set of rules for mapping in scalable representations, wherein each respective user of the users is identified by a respective user identifier of the user identifiers; and converting the scalable representations to automated artifacts for the one or more producers to provide data into a central representation.

6. The system of claim 1, wherein the second layer further comprises a layer of tables comprising bundled registered queries for each of the data clients.

7. The system of claim 1, wherein translating the event records into the NoSQL schema further comprises:

generating, based on the access patterns, the first layer of the dataset layers, wherein the first layer further comprises historical interactions of the users.

8. The system of claim 1, wherein the second layer of the dataset layers further comprises a known-pattern-query state.

9. The system of claim 8, wherein the intermediate states comprise one or more of aggregations or transformations responsive to the subset of the queries.

10. The system of claim 1, wherein translating the event records into the NoSQL schema comprises:

generating, based on the access patterns, a third layer of the dataset layers comprising transformed data specific to one or more of the data clients, wherein the transformed data comprises the event records from another one of the dataset layers.

11. A method being implemented via execution of computing instructions configured to run on one or more processors and stored at one or more non-transitory computer-readable media, the method comprising:

translating event records into a non-relational (NoSQL) schema, wherein translating the event records into the NoSQL schema comprises:

determining access patterns of data clients, wherein dataset layers are based on the access patterns of the data clients;

generating, based on the access patterns, a second layer of the dataset layers, wherein the second layer comprises intermediate states for a subset of queries of the access patterns that exceed a predetermined threshold, wherein the NoSQL schema comprises the dataset layers, wherein the dataset layers comprises a first layer and the second layer, wherein the first layer comprises user profiles of users; and periodically updating the second layer in the NoSQL schema as additional queries of the access patterns exceed the predetermined threshold;

defragmenting the event records by assigning user identifiers of the users to the event records received in the event streams from one or more producers in a user domain object model;

bundling multiple registered queries of a dataset using a scheduling technique, wherein the dataset is homogenous in schema;

running a single table scan of the dataset to process the multiple registered queries of the dataset in parallel; and generating a respective output responsive to each of the multiple registered queries.

12. The method of claim 11, wherein running the single table scan further comprises, at each respective row of the dataset:

extracting attributes from the respective row of the dataset responsive to the multiple registered queries.

13. The method of claim 11, wherein defragmenting the event records comprises:

using a type of data defragmentation process configured to receive data from multiple sources with the user identifiers;

determining, using the data defragmentation process, whether each source of the multiple sources with the user identifiers is mapped to a sane user; and after identifying the same user is mapped to more than one source of the multiple sources or more than one of the one or more producers, re-assigning a common identifier for the same user for each respective event record of respective event records mapped to the same user, wherein the event records comprise the respective event records.

14. The method of claim 11, wherein:

a customer domain object model combines the event records into a single state for serving in batch data or real-time.

15. The method of claim 11, wherein defragmenting the event records comprises:

identifying which respective records of the event records are associated with each respective user of the users using a set of rules for mapping in scalable representations, wherein each respective user of the users is identified by a respective user identifier of the user identifiers; and converting the scalable representations to automated artifacts for the one or more producers to provide data into a central representation.

16. The method of claim 11, wherein the second layer further comprises a layer of tables comprising bundled registered queries for each of the data clients.

17. The method of claim 11, wherein translating the event records into the NoSQL schema further comprises:

generating, based on the access patterns, the first layer of the dataset layers, wherein the first layer further comprises historical interactions of the users.

18. The method of claim 11, wherein the second layer of the dataset layers further comprises a known-pattern-query state.

19. The method of claim 18, wherein the intermediate states comprise one or more of aggregations or transformations responsive to the subset of the queries.

20. The method of claim 11, wherein translating the event records into the NoSQL schema comprises:

generating, based on the access patterns, a third layer of the dataset layers comprising transformed data specific to one or more of the data clients, wherein the transformed data comprises the event records from another one of the dataset layers.

\* \* \* \* \*